(12) United States Patent
Peng et al.

(10) Patent No.: US 10,169,907 B2
(45) Date of Patent: *Jan. 1, 2019

(54) MULTI MODE TEXTURE SAMPLER FOR FLEXIBLE FILTERING OF GRAPHICAL TEXTURE DATA

(71) Applicant: INTEL CORPORATION, Santa Clara, CA (US)

(72) Inventors: Liang Leon Peng, San Jose, CA (US); Steven Spangler, El Dorado Hills, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/148,728

(22) Filed: May 6, 2016

(65) Prior Publication Data
US 2017/0098328 A1 Apr. 6, 2017

Related U.S. Application Data

(63) Continuation of application No. 14/080,357, filed on Nov. 14, 2013, now Pat. No. 9,355,489.

(51) Int. Cl.
G06T 15/04 (2011.01)
G06T 1/20 (2006.01)
(Continued)

(52) U.S. Cl.
CPC ............ *G06T 15/04* (2013.01); *G06T 1/20* (2013.01); *G06T 1/60* (2013.01); *G06T 15/005* (2013.01);
(Continued)

(58) Field of Classification Search
CPC .. G06T 1/20; G06T 1/60; G06T 15/04; G06T 15/005
(Continued)

(56) References Cited

U.S. PATENT DOCUMENTS 6,366,290 B1* 4/2002 Dye ..................... G06T 15/04
345/582
7,477,261 B2 1/2009 Pallister
(Continued)

FOREIGN PATENT DOCUMENTS

KR 20060107834 10/2006
WO 2005066895 A2 7/2005

OTHER PUBLICATIONS

Office Action for Korean Application No. 10-2014-0138651, dated Nov. 2, 2015, 4 pages.
(Continued)

Primary Examiner — Jacinta M Crawford

(57) ABSTRACT

For a given texture address, a texture sampler fetches and reduces texture data with a filter accumulator suitable for providing a weighted average over a variety of filter footprints. A multi-mode texture sampler is configurable to provide both a wide variety of footprints in either a separable or non-separable filter modes and allow for a filter footprint significantly wider than the bi-linear (2×2 texel) footprint. In embodiments, sub-sample addresses are generated by the texture sampler logic to accommodate a desired footprint. The sub-sample addresses may be generated and sequenced by multi-texel units, such as 2×2 texel quads, for efficient filtering. In embodiments, filter coefficients are cached from coefficient tables stored in memory.

26 Claims, 12 Drawing Sheets

(51) Int. Cl.
*G06T 1/60* (2006.01)
*G06T 15/00* (2011.01)

(52) U.S. Cl.
CPC ...... *G06T 2200/04* (2013.01); *G06T 2200/28* (2013.01)

(58) Field of Classification Search
USPC .......................................................... 345/582
See application file for complete search history.

(56) References Cited

U.S. PATENT DOCUMENTS

| | | |
|---|---|---|
| 7,719,544 B2 | 5/2010 | Boyd et al. |
| 2003/0151608 A1* | 8/2003 | Chung ...................... G06T 1/20 345/506 |
| 2006/0202990 A1* | 9/2006 | Barenbrug ............ G06T 15/005 345/426 |
| 2006/0250407 A1* | 11/2006 | Xu .......................... G06T 15/04 345/582 |
| 2007/0008333 A1* | 1/2007 | Xu .......................... G06T 15/04 345/582 |
| 2007/0279434 A1* | 12/2007 | Fujita ...................... G06T 15/04 345/611 |
| 2011/0292048 A1 | 12/2011 | Chien et al. |

OTHER PUBLICATIONS

Nickolls, et al., "Graphics and Computing GPUs", Computer Organization and Design: The Hardware/Software Interface, D.A. Patterson and J. L. Hennessy, 4th ed., Morgan Kaufmann, 2009, 76 pages.

\* cited by examiner

| H-Coeff. Table 671 ||||||||||
|---|---|---|---|---|---|---|---|---|---|
| $\beta_u$ | $Tap_0$ | $Tap_1$ | $Tap_2$ | $Tap_3$ | $Tap_4$ | $Tap_5$ | $Tap_6$ | $Tap_7$ • • • | $Tap_{n-1}$ |
| .0 | HC[0:0] | HC[1:0] | | | | | | | |
| .1 | HC[0:1] | HC[1:1] | • • • | | | | | | |
| ⋮ | | | | | | | | | |
| $1-\Delta\beta_u$ | | | | | | | | | |

FIG. 6C

| V-Coeff. Table 672 ||||||||||
|---|---|---|---|---|---|---|---|---|---|
| $\beta_v$ | $Tap_0$ | $Tap_1$ | $Tap_2$ | $Tap_3$ | $Tap_4$ | $Tap_5$ | $Tap_6$ | $Tap_7$ • • • | $Tap_{n-1}$ |
| .0 | VC[0:0] | VC[1:0] | | | | | | | |
| .1 | VC[0:1] | VC[1:1] | • • • | | | | | | |
| ⋮ | | | | | | | | | |
| $1-\Delta\beta_v$ | | | | | | | | | |

FIG. 6D

MULTI MODE TEXTURE SAMPLER FOR FLEXIBLE FILTERING OF GRAPHICAL TEXTURE DATA

TECHNICAL FIELD

Embodiments of the implementation generally relate to computer graphics, and more particularly relate to sampling and filtering of texture data.

BACKGROUND

Graphics rendering, particularly for three dimensional (3D) graphics applications, is one of the most processing intensive activities performed by personal computers. Graphics co-processors are available on most modern day personal computers. FIG. 1A is a system 100 employing a graphics processor 101 and a central processor 102, each coupled to a system memory 103 (e.g., DRAM, eDRAM, etc.) by a bus. Central processor 102 and graphics processor 101 may be disposed on a single piece of silicon (i.e., a single-chip solution), or integrated at a package, board, or system level. Graphics processor 101 includes a plurality of parallel processing sub-systems, or slices 105. Each slice 105 may be replicated any number of times for greater parallel graphics processing power. Within slice 105, there are a number of execution units (EU) 110, also known as "shader cores," or simply "cores." Each EU 110 contains scalar integer and floating-point arithmetic units that execute instructions. Each EU 110 has an instruction set architecture (ISA), may support context switching and pre-emptive multi-tasking, and may be essentially a complete x86 core, for example. Along with EUs 110, slice 105 includes a level two (L2) cache 130 (e.g., SRAM, eDRAM, etc.) and texture sampler 120. Texture sampler 120 includes fixed function logic (e.g., state machines). Texture sampler 120 may communicate with EU 110 via cache 130. Cache 130 may function as a texture cache that is a read-only memory to texture sampler 120 holding large arrays of predetermined texture data for use in texture mapping when a graphic is rendered for display by a platform hosting system 100.

The transformation of scene information (source data) into displayable images requires a number of functionalities, referred to in aggregate as a 3D graphics rendering pipeline. FIG. 1B is flow diagram depicting certain operations particular to a texture mapping portion of the graphics rendering pipeline. Texture mapping 101 generally entails imaging a textured signal onto a primitive's geometry, for example giving the appearance of pixel-level detail on more coarsely rendered polygon meshes that are manipulated on a vertex basis. At operation 105, texture coordinates are assigned to vertices of a given polygon. Generally, a texture is a digital image comprising an array of texels (texture elements), which may be individually addressed based on location within a two-dimensional (u,v) coordinate space, or in a three-dimensional (u,v,s) coordinate space. In the (u,v) coordinate space, u is the width and v is the height, and may be mapped between 0 and 1 based on the texture width and height. At operation 107 the texture coordinates are interpolated at each pixel within the polygon. At operation 111, a texture color at each pixel is fetched into cache based on the interpolated texture coordinate. At operation 113, the texture is sampled and filtered to arrive at a particular texel color at each pixel. Often, there is a disparity between a number of sample texture elements (texels) and the source texture image and the number of picture elements (pixels) to which the image is mapped. If a texture is too large or too small for a given polygon, the texture is filtered to fit the space. A magnification filter enlarges (zooms-in) a texture, a minification filter reduces (zooms-out) the texture to fit into a smaller area. Texture magnification maps few texels to many pixels by repeating the sampled texel for a plurality of addresses, for example providing a blurrier image. Texture minification maps many texels to few pixels by combining more than one texel value into a single value. This can cause aliasing or jagged edges, and antialiasing techniques become important to reduce visual artifacts. The goal of texture filtering then is to compute the average value of the image over an area around each pixel, for example through averaging of many texels associated with a given pixel.

Texture filtering has largely been performed by fixed-function logic found in texture sampler 120. Such texture samplers have a fixed filter footprint (shape) associated with a type of texture filtering, such as point sampling, bi-linear filtering, tri-linear filtering, and anisotropic filtering. As the filtering methods become increasingly complex, and as uses for texture data continues to expand, for example, being used for lighting and other surface properties in addition to color, a sampler with a fixed-function filter has become inefficient and/or insufficient. As such, shader programs instantiated by EU 110 have taken larger roles in texture mapping, for example resulting in the architecture of system 106 illustrated in FIG. 1C. In system 106, EU 110 implements a filter footprint 140 in an application layer, and a plurality of texture requests in (u,v) space associated with footprint 140 are sent to the texture sampler 120. Texture sampler 120 then fetches texture data 115 into the cache for each of the (u,v) addresses associated with filter footprint 140. EU 110 executing instructions defined in the application layer then accumulates texture data 115. As such, texture data for an entire footprint is passed through the texture sampler with no data reduction because filtering is off-loaded from fixed-function logic 131 onto EU 110. In this configuration however, sampler chip area occupied by fixed-function logic 131 is wasted. Another issue with this architecture is reduced cache usage efficiency. With multiple sampler messages sent from a kernel there's a higher probability that the interleaved messages from multiple EUs will cause many cache evictions. Furthermore, texture mapping bandwidth is potentially constrained with the greater amount of data communicated between EU 110 and texture sampler 120 since texture data is not significantly processed and/or reduced by texture sampler 120. Another disadvantage of the system architecture depicted in FIG. 1C is that filtering performed by EU 110 may require more power and may be slower than if implemented with optimized, purpose-built logic within texture sampler 120. Therefore, the programmability afforded with shader-based filtering may be particularly disadvantageous for mobile devices executing graphics-intensive applications where the greater power demand translates into reduced battery life.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 6C and 6D illustrates filter coefficient tables that may be populated in preparation of performing the separable filter method depicted in FIG. 6A, in accordance with one or more embodiments;

DETAILED DESCRIPTION

Figure 1A:
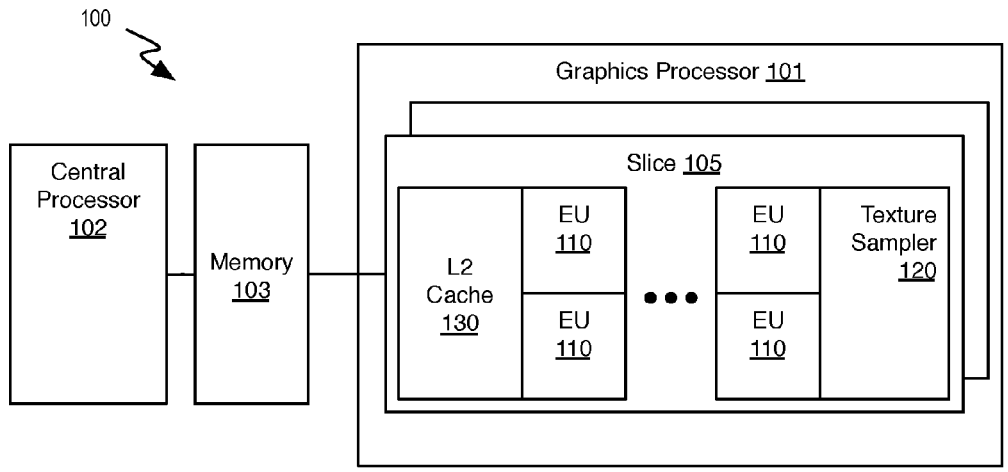
FIG. 1A, is a conventional system architecture including a central processor and a graphics processor.
Figure 1B:
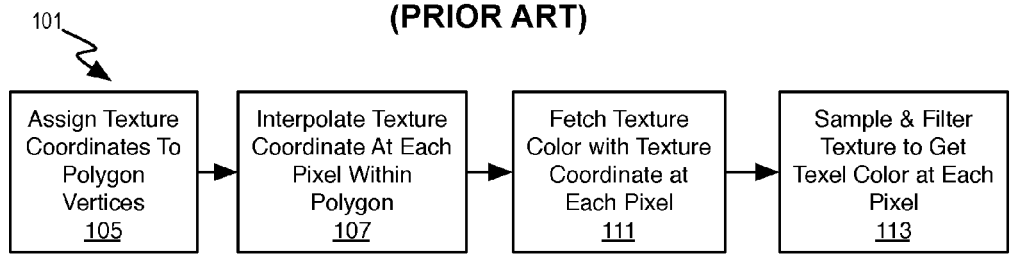
FIG. 1B is flow diagram depicting particular texture mapping operations in a typical graphics rendering pipeline within a graphics processor.
Figure 1C:
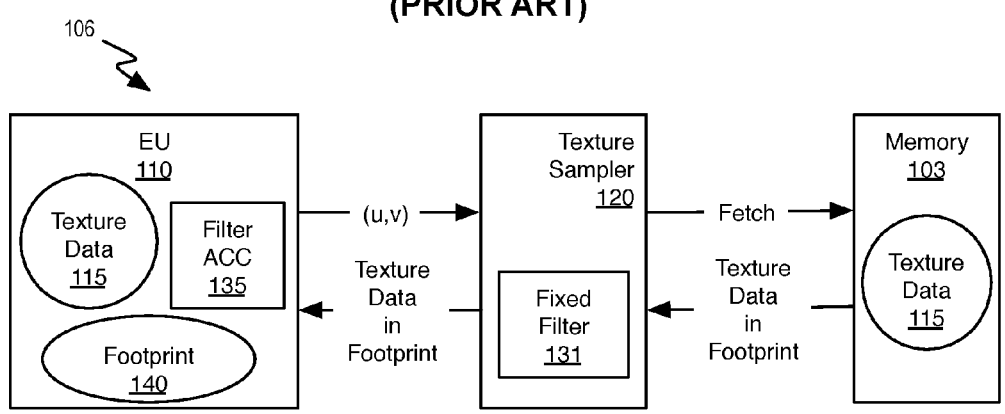
FIG. 1C is a conventional graphics processor architecture employing a shader for texture filtering.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that the present implementation may be practiced without these specific details. Well-known methods and devices are shown in block diagram form, rather than in detail, to avoid obscuring the present implementation. Reference throughout this specification to "an embodiment" or "one embodiment" means that a particular feature, structure, function, or characteristic described in connection with the embodiment is included in at least one embodiment of the implementation. Thus, the appearances of the phrase "in an embodiment" or "in one embodiment" in various places throughout this specification are not necessarily referring to the same embodiment of the implementation. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the implementation and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used in throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures or graphics processors for example, implementation of the techniques and/or arrangements described herein are not restricted to particular architectures and/or computing systems and may be implemented by any architecture and/or computing system for similar purposes. For example, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Figure 1D:
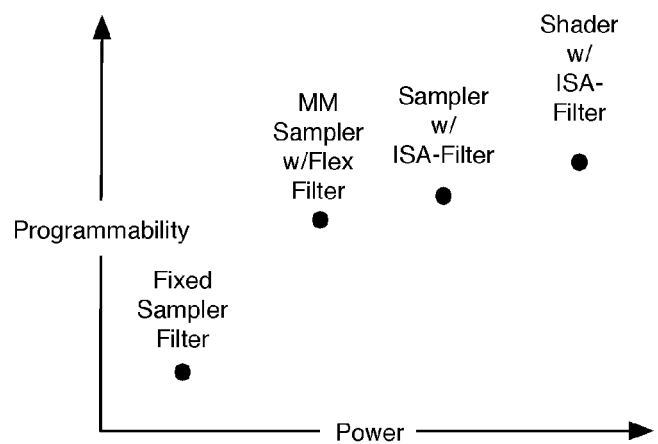
FIG. 1D is a graph comparing certain texture filtering architectures that may be utilized in a graphics processor.
Figure 1E:
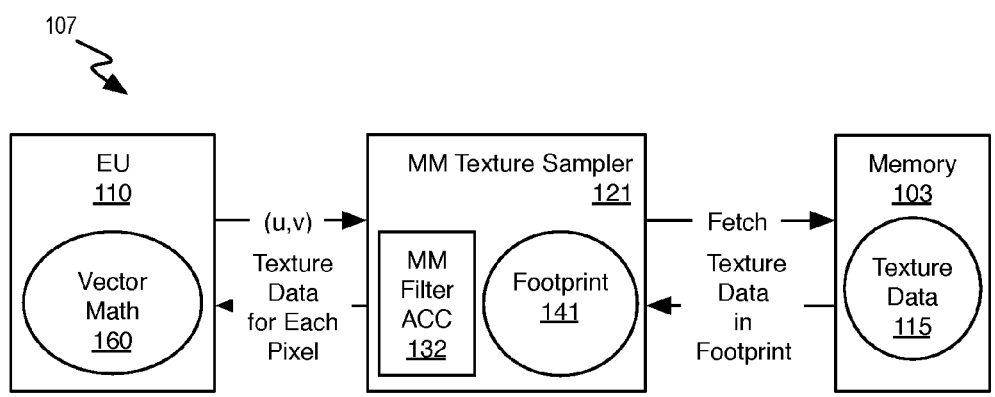
FIG. 1E is a graphics processor architecture employing a multi-mode texture sampler, in accordance with an embodiment.

Systems, apparatus, articles, and methods are described below including a multi-mode texture sampler capable of flexible filtering operations providing a high performance and low power solution for 2D and 3D visual computing applications. FIG. 1D is a graph comparing certain sampler architectures that may be employed by a graphics processor with respect to their relative power requirements and programmability. Near the origin is a fixed function sampler filter, offering for example a bi-linear texture filter. Highly optimized filter function logic may implement such a filter very economically for lowest power and high efficiency. However, the lack of programmability of this filter is unable to accommodate any application-specific filter. On the other extreme is the shader implementing an fully programmable ISA filter, which may accommodate any application-specific filtering operation but consumes the most power. One step down in power and programmability from the shader filter is a sampler with an ISA filter within sampler. For such an architecture, the sampler has some of the functionality currently found in a shader core/EU (e.g., a programmable register-based scalar instruction set, integer, logic, flow control, and memory access) in addition to the conversion and special functions typical of texture operations. The ISA filter in sampler can be expected to require power similar to the shader-core filter implementation and the greater sampler complexity requires significant increases in chip area. For further comparison, the power and programmability attributes of the exemplary multi-mode (MM) sampler with a flexible filter in accordance with embodiments herein is also depicted in FIG. 1E. The MM sampler embodiments described herein provide a significant increase in filter programmability, indeed arguably enabling the sampler to perform most any texture filtering currently implemented on an ISA filter. However, with only a slight increase in power, if any, relative to a fixed function sampler.

Relative to shader-based filters, the multi-mode texture sampler embodiments described herein may further provide more balanced heterogeneous computing, for example as depicted in the graphics processor architecture 107 of FIG. 1E. In exemplary architecture 107, EU 110 is to perform vector math 160, higher-level rendering algorithms, and memory writes, etc. When texture mapping is needed, a texture address (u,v) is communicated to a multi-mode (MM) texture sampler 121. For a given texture address, MM texture sampler 121 is to fetch texture data 115 for a variety of footprints 141, and reduce texture data 115 by processing with MM filter accumulator 132. MM filter accumulator 132 is suitable for providing output values corresponding to a weighted average over the variety of filter footprints 141. MM texture sampler 115 returns to the EU 110 reduced data corresponding a sampled, filtered pixel color (R/G/B) at each pixel. Unlike a fixed-function texture sampler, MM texture sampler 121 is configurable to accommodate both a wide variety of footprints and allow for a footprint to be significantly wider than the bi-linear (2×2 texel) footprint often employed in fixed-function minification filtering. The MM texture sampler 121 can require less power and reduced EU-to-sampler communication while still providing a greater level functionality, such as lighting/shadowing effects, heretofore available only through shader-based filters. In exemplary embodiments, in addition to supporting flexible footprints, MM texture sampler 121 further supports legacy fix-function modes, such as point and/or linear sampling, and bilinear and/or trilinear filter modes.

Figure 2:
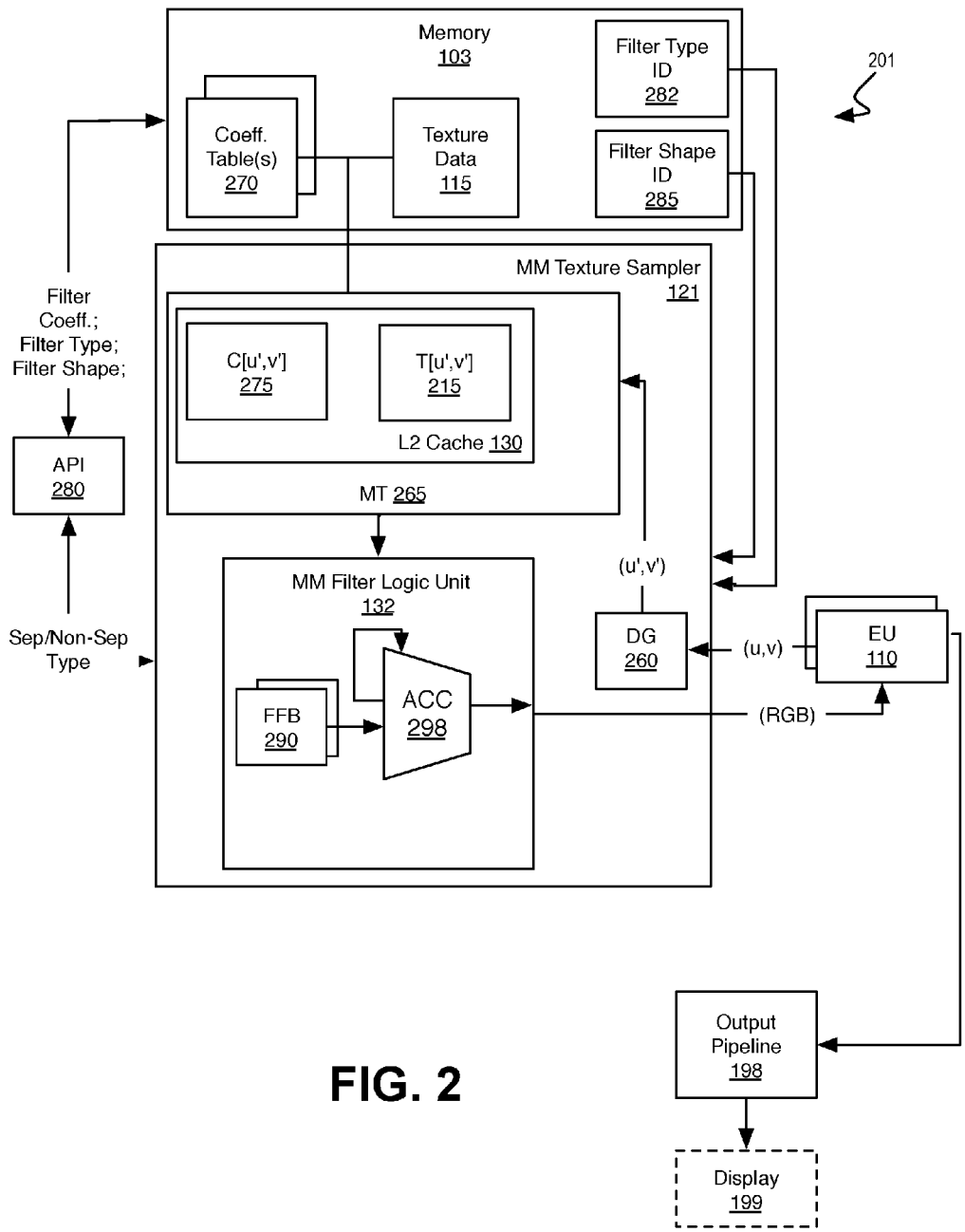
FIG. 2 is a functional block diagram further illustrating a system including a graphics processor with a multi-mode flexible texture sampler, in accordance with an embodiment.

FIG. 2 is a functional block diagram further illustrating a system 201 including a graphics processor employing multi-mode flexible texture sampler 121, in accordance with an embodiment. System 201 includes one or more EU 110 communicatively coupled to MM texture sampler 121. EU 110 is to provide an input texture address or coordinate, for example in (u,v) space, to MM texture sampler 121. While two dimensional texture addresses are employed in the description herein, it is noted that the techniques and hardware described herein may be adapted to greater dimensionality (e.g., 3D) by one of ordinary skill. MM sampler 121 includes a logic circuitry represented as data generator (DG) 260, which is to generate texel sampling addresses (i.e. sub-samples) based on the input texture address and a based further on a desired filter footprint. The sub-sample addresses (u',v') generated by DG 260 identify one or more texel sub-sampling position within a predetermined bounding region within which a footprint is defined. Sub-sampling addresses (u',v') are sequenced and passed to multi-thread (MT) unit 265, which is to fetch data into cache 130 and handle overhead associated with the cache FIFO (e.g., locality-based fetching, latency, cache misses, etc.). In embodiments herein, MT unit 265 caches texel data T[u',v'] 215 associated with each sub-sample address. Whereas a conventional fixed function sampler may be called upon to dynamically calculate filter coefficients for an input texture address, for example through a bi-linear interpolation algorithm, MT unit 265 further caches predetermined filter (weighting) coefficients 275 associated with each (u',v') sub-sample address (i.e., C[u',v']).

Filter coefficients 275 are an additional input to MM texture sampler 121. Filter coefficients 275 may be stored in memory 103, entered for example as one or more coefficient tables 270 through API 280. API 280 may be implemented for example as a set of extensions to an existing graphics processor API, such as, but not limited to, DirectX and OpenGL. API 280 exposes coefficient tables 270 to an application layer and may allow the tables to be populated with predetermined values appropriate for a given filter. As one example, an application layer routine that evaluates a Gaussian blur function may be executed to automatically generate coefficients values stored in coefficient tables 270. Fixed memory allocations for storing values in coefficient table(s) 270 may be made based on the size of the predetermined bounding region within which a footprint is defined, as well as the mode of the MM texture sampler.

In embodiments, MM texture sampler 121 is selectively operable in both a separable filter mode and a non-separable filter mode for any of a plurality of programmable filter footprints. In the exemplary embodiment, the non-separable filter mode implements the filter function, $$\Box = \sum_{\Box=0}^{\Box} \sum_{\Box=0}^{\Box} \Box_{\Box\Box} \Box_{\Box\Box}$$

where $C_{x,y}$ is the filter coefficient for a given sampled address (u',v') and $T_{x,y}$ is the texel (color) value for the given sampled address (u',v'). The weighting is generally performed over the entire bounding region, m, which is predetermined to be some fixed size sufficient to implement all desired footprints. In one exemplary embodiment, m=7, allowing for up to an 8×8 texel footprint to be defined. For such embodiments, coefficient table 270 includes one coefficient for each texel within the bounding region m. MM texture sampler 121 is further operable in a separable filter mode. In one exemplary embodiment, the separable filter mode implements the filter function:

$$\Box = \sum_{\Box=0}^{h-1} \sum_{\Box=0}^{\Box-1} \Box_{\Box,\Box} \Box_{\Box,\Box} \Box_{\Box\Box}$$

where $H_{A,x}$ is a horizontal filter coefficient, $V_{B,y}$ is a vertical filter coefficient for a given filter width w and height h defined within the predetermined bounding region. As for non-separable coefficient $C_{x,y}$, values of separable coefficients $H_{A,x}$ and $V_{B,y}$ may be stored in coefficient table(s) 270 as source data for cache fetches. Each of $H_{A,x}$ and $V_{B,y}$ may be discrete approximation values of convolution functions that are to be applied on the filtered surface. While both the separable and non-separable filter modes are further described below in the context of the above exemplary filter functions, it is noted one of ordinary skill in the art may adapt the architecture and techniques described herein to another non-separable and/or separable filter function.

In embodiments, API 280 further exposes a filter type ID 282 that is indicative of the mode in which MM texture sampler 121 is to operate while remaining in a given state. For example, filter type ID 282 may store a flag bit, etc. specifying the non-separable or separable filter mode. In further embodiments, API 280 may additionally expose a filter shape ID 285. MM sampler 121, and more specifically DG 260, may utilize the filter shape ID 285 to efficiently generate contributing sub-sample addresses (i.e., those addresses within the predetermined bounding region having non-zero filter coefficients). In one embodiment of the separable filter mode, filter shape ID 285 stores the filter height h and width w of the separable filter. In one embodiment of the non-separable filter mode, filter shape ID 285 stores a bit mask that specifies filter coefficients within the bounding region that are non-zero. Such a bit mask may be generated, by a graphics processor driver for example, based on entries in the coefficient table(s) 270.

As further illustrated in FIG. 2, MM texture sampler 121 includes multi-mode filter logic (MM FL) unit 132, which performs filtering and returns a color value (e.g., R/B/G, R/B/G/A, etc.) at each pixel based on the filter mode, filter footprint, texel values, and filter coefficient values. This returned value may then be utilized in output pipeline 198 and output to display 199 (or utilized in a hidden layer calculation, etc.). MM FL 132 includes flexible filter block (FFB) 290 having logic circuitry to perform filtering over any flexible footprint provided in either separable or non-separable filter modes. MM FL 132 further includes accumulator 298 that is to accumulate a plurality of flexible filter block outputs to generate a weighted average over a given flexible filter footprint. MM FL 132 may further include a divider (not depicted) to normalize output from FFB 290 or accumulator 298 before returning the filter value to EU 110. As such, MM FL 132 is configurable to perform weighted accumulation on colors of all texels within the footprint, for example as defined by filter type ID 282, and/or filter shape ID 265. In further embodiments, as described elsewhere herein, MM FL 132 is sufficiently generalized to also perform conventional bi-linear filtering at a rate unimpeded by the more flexible architecture of MM FL unit 132.

Figure 3:
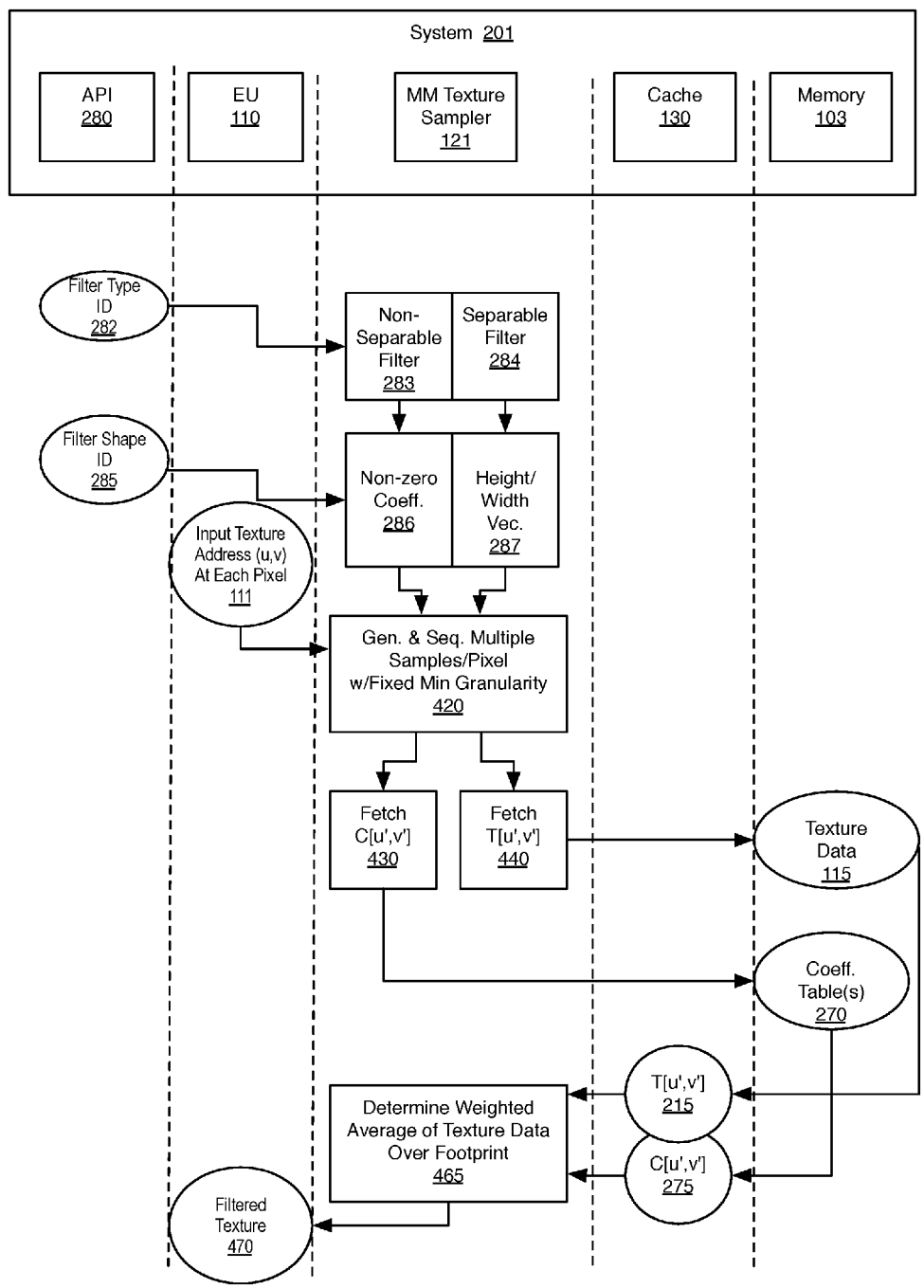
FIG. 3 illustrates how multi-mode flexible texture filtering methods may be performed by a system having an architecture as in FIG. 2, in accordance with one or more embodiments.

FIG. 3 illustrates how multi-mode flexible texture filtering methods may be performed by the system 201 having the architecture as depicted in FIG. 2, in accordance with embodiments. Dotted lines in FIG. 3 demark exemplary functional partitions between the various components of system 201 to illustrate an association between certain actions and particular components of exemplary system 201 responsible for conducting the action. As shown, non-separable or separable filtering modes 283, 284 of the MM texture sampler 121 are specified through API 280 by filter type ID 282. Filter shape may be further parameterized either through a masking of zero value coefficients 286 or with filter shape ID 285 specifying height and width filter vectors 287. Upon receiving a seeding input texture address 111 at each pixel from EU 110, multiple (sub)samples at each pixel are generated and sequenced at operation 420, as described in further detail below. At operation 430, MM texture sampler 121 fetches predetermined filter coefficient values 215 for each generated sub-sample into cache 130, for example from stored coefficient tables 270. At operation 440, MM texture sampler 121 fetches predetermined texel data values 215 for each generated sub-sample into cache 130, for example from stored texture data 115. At operation 465, MM texture sampler 121 determines a weighted average of the color values over the entire footprint, for example by implementing one of the filter functions above, and returns to EU 110 a filtered, sampled texture 470.

Figure 4:
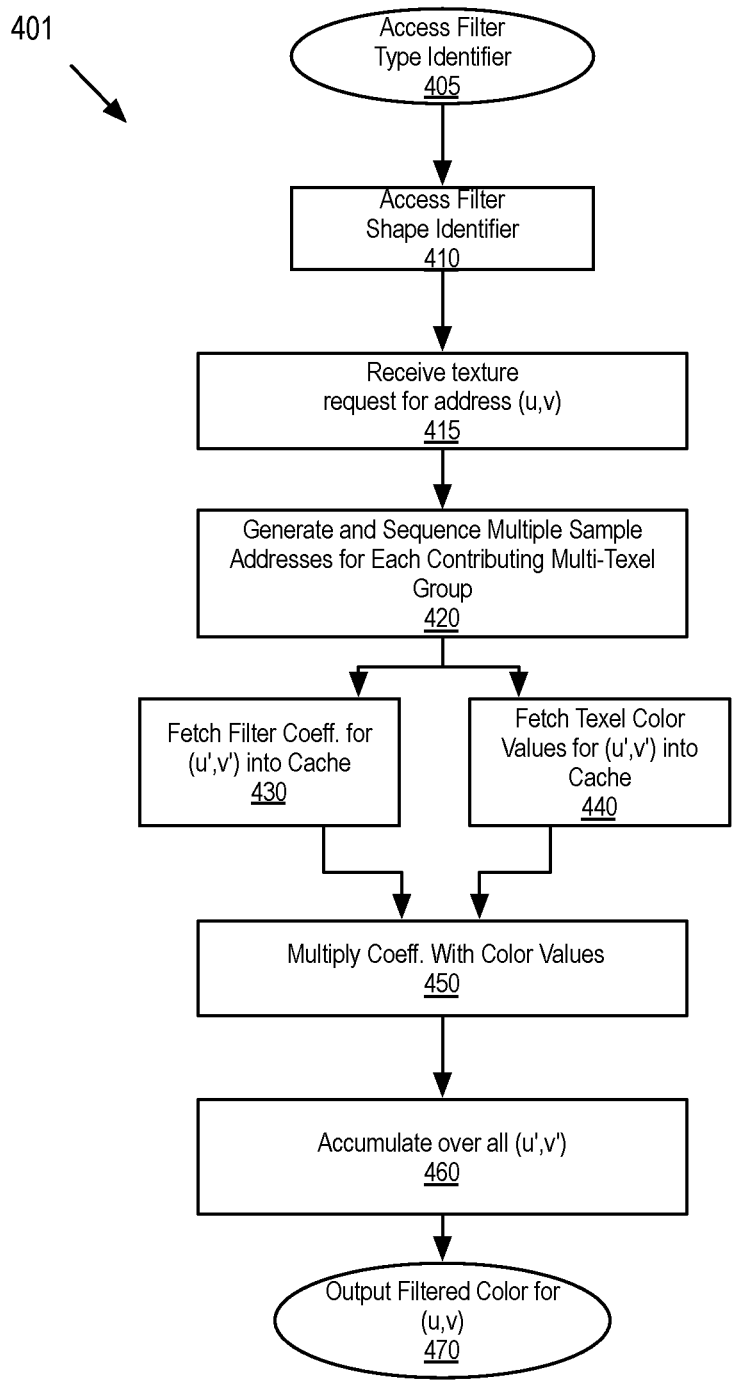
FIG. 4 is a flow diagram illustrating a multi-mode flexible texture filter method, in accordance with one or more embodiments.

Further explanation of an exemplary multi-mode flexible texture filter method 401 is described in the context of FIG. 4. In accordance with the exemplary embodiment, method 401 is performed by the system 201 depicted in FIG. 2. In accordance with other embodiments, a texture sampler having an arbitrary alternative hardware architecture performs method 401. For example, a texture sampler having only one of a separable and non-separable filter mode may nonetheless implement certain aspects of the method 401. In accordance with still other embodiments, a graphics processor having alternate arrangements of logic circuitry and application software may perform method 401. For example, a texture sampler may implement only some of the functions described in the context of FIG. 4 in hardware while other functions are implemented in software. As such, while in one embodiment the method 401 is performed by system 201, system 201 is not required to perform method 401 and system 201 need not perform every operation of method 401.

Figure 5A:
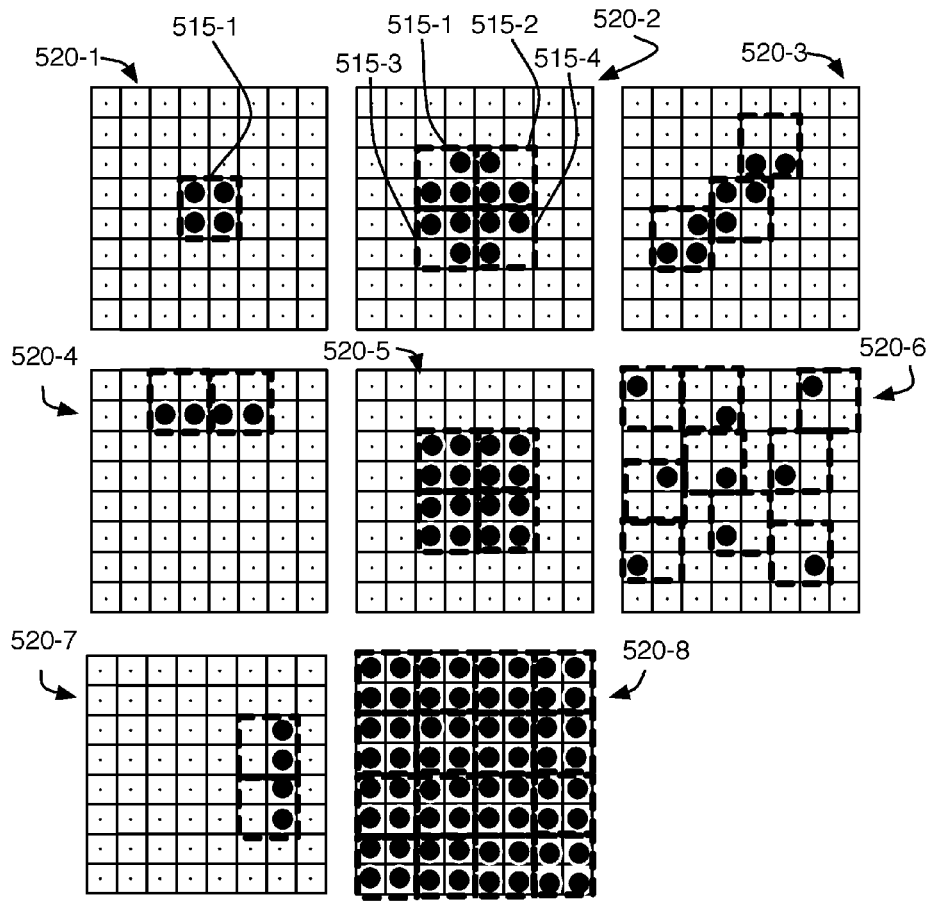
FIG. 5A illustrates a variety of exemplary programmable footprints that may be implemented through application of a texel quad performed as part the method depicted in FIG. 4, in accordance with one or more embodiments

Method 401 begins at operation 405 with a texture sampler accessing a filter type identifier to determine whether to enter a non-separable filter state or a separable filter state. At operation 410, for either a non-separable or a separable filter, the texture sampler may further access a filter shape identifier to determine the filter footprint parameters. A footprint includes all texels that contribute to a filtered texture value. FIG. 5A illustrates a variety of exemplary footprints that may be "programmed" within the exemplary 8×8 bounding regions, in accordance with embodiments. A large dot in FIG. 5A represents an output texel sample associated with a non-zero filter coefficient that therefore contributes to the particular filtered value, while a small dot is a non-contributing texel associated a zero-valued coefficient. Notably, because embodiments herein enable designation of a vast number of arbitrary footprints, the eight examples depicted in FIG. 5A do not represent an exclusive listing, but instead are merely to show the great variety of permissible filter shapes and sizes. Filter footprint 520-1 for example has the same size as a conventional bi-linear interpolation filter footprint, while footprint 520-2 is useful for a Gaussian filter. Footprints 520-3, 520-4, and 520-7 are all exemplary anisotropic filter shapes. Footprint 520-5 is useful for a bi-cubic filter), and footprint 520-8 illustrates a maximum 8×8 texel filter.

Figure 5B:
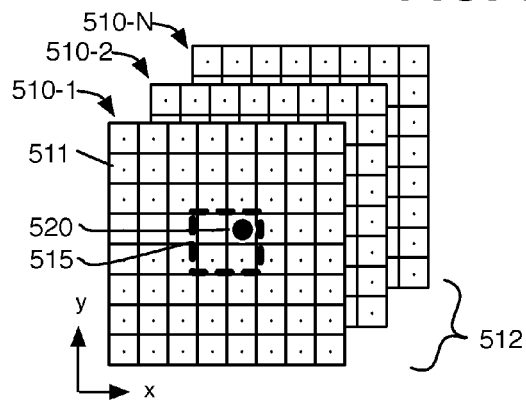
FIG. 5B depicts a plurality of footprints and corresponding bounding regions that may be employed in a multi-mode flexible texture sampler when performing the method depicted in FIG. 4, in accordance with one or more embodiments.

In the exemplary embodiment, any of a plurality of filter footprints may be defined within a predetermined bounding region. A particular footprint may be associated with a given sampler state, permitting a filter footprint changes with each sampler state change, if desired. The number of different filter footprints possible for a given texture sampler is therefore scalable with the number of filter states that are permissible. FIG. 5B depicts a plurality of footprints 512 that may each be associated with a given state of a multi-mode flexible texture sampler, in accordance with embodiments. For each of footprints 512, there are a fixed number of texels 511 within an 8×8 bounding region (e.g., 510-1, 510-2, 510-N). This dimensionality may vary however as an implementation detail. In one illustrative embodiment, a first filter footprint, suitable for an anisotropic filter, is applied in one filter state, while another footprint suitable for a Gaussian filter is applied in another filter state.

Figure 5C:
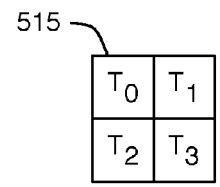
FIG. 5C depicts a texel quad representing a minimum granularity of a multi-mode flexible texture sampler, in accordance with one or more embodiments.

Returning to FIG. 4, upon receiving a texture request at operation 415, for example in the form of a texture address from a shader core, the texture sampler generates a sequence of texel sub-sample addresses (u',v') at operation 420 based on the filter footprint. The filter footprint is applied to the input texture address (u,v) by referencing the sampling positions associated with the footprint to the input texture address. In the exemplary embodiment, the bounding region (e.g., 510-1 in FIG. 5B) is centered at the input texture address (u,v) with output sampling positions then being referenced to addresses (u',v'). In embodiments, sub-sample addresses (u',v') are generated for each of a predetermined number of samples associated with a group of neighboring texels that contain at least one contributing texel. This group of neighboring texels represents a minimum granularity for generation of output samples from any given input address and any given footprint. In one embodiment, this minimum granularity is a texel quad, or 2×2 of neighboring texels. FIG. 5C depicts the exemplary texel quad 515 inclusive of texels $T_0$, $T_1$, $T_2$, and $T_3$ represented by a 2×2 of sampling addresses. Embodiments herein leverage the texel quad as an atomic addressing unit advantageous in many respects because of the significant amounts of sampler logic circuitry designed to efficiently utilize pixel locality. For example, values associated with a 2×2 address sequence can be efficiently fetched into a single cache line from memory. Hence, even where a footprint includes only one texel, such as depicted in FIG. 5B, a sequence of four sub-sample addresses (u',v') are generated. For example, in texel quad 515 that contains one contributing texel specified by footprint 520, one sub-sample address for each of texel $T_0$, $T_1$, $T_2$, and $T_3$ is generated for a given input texture address (u,v).

Dashed boxes in FIG. 5A further illustrate exemplary texel quads for each illustrated footprint. For example, footprint 520-2 results in generation of four texel quads: 515-1; 515-2; 515-3; and 515-4. For each quad 515-1 through 515-4, four sub-sample addresses are generated for a total of 16 sub-samples for a given input texture address (u,v). Similarly, footprint 520-3 results in generation of 12 (u',v') sub-sample addresses corresponding to three texel quads. Generation of sub-sample address may proceed over a single or multiple clock cycles. In further embodiments, logic circuitry within the texture sampler (e.g., within the data generator) internally sequences the sub-sample addresses following one or more algorithm to minimize the number of texel quads generated for a given footprint, and/or to maximize coherency of sampling positions, etc. In further advantageous embodiments, the bounding regions (e.g., 510-1, 510-2, 510-N in FIG. 5B) are dimensioned to contain an even multiple of the multi-texel sampling group of minimum granularity. For example, as shown in FIG. 5A, for an 8×8 texel bounding region, footprint 520-8 fills the bounding region and a sequence of 16 texel quads are generated corresponding to 64 output sub-sample addresses (u',v') for an input texture address (u,v) at each pixel.

Notably, any of the footprints depicted in FIG. 5A may be implemented in either separable or non-separable modes of the texture sampler. In the separable filter mode the footprint is defined as the product of two footprints in 1D space. The filter shape identifier may then be indicative of a 1D width vector associated with a first 1D footprint, and a 1D height vector associated with a second 1D footprint, for example. The texture sampler then generates four sub-sample addresses for each texel quad containing at least one texel specified by a first 1D footprint having a first programmable number of texels (e.g., programmable width w) and a second 1D footprint having a second programmable number of texels (e.g., programmable height h). With the predetermined bounding region referenced to the input texture address (u,v), sub-sampling positions specified in the separable filter footprint may be addressed as (u',v').

In the non-separable filter mode where there is one coefficient $C_{xy}$ for each texel within the bounding region, four sub-sample addresses are generated for each texel quad that contains at least one texel having a non-zero coefficient value. In this mode, the filter coefficient table may serve to specify the footprint with the non-zero coefficient values being the only sampling positions contributing to the filter. For such embodiments, all coefficients may be read to generate a sequence of sub-sample addresses. In further embodiments, a sampling mask may be generated from the coefficient table. As one example, 16 bits may specify an 8×8 bounding region, with each bit of the mask indicating one or a few coherent sampling positions (e.g., one 2×2 quad) within the bounding region of the corresponding filter. Notably, with all the sub-sample addresses (u',v') now generated for all multi-texel groupings containing at least one contributing texel, processing of each sub-sample address can efficiently proceed through the filter logic circuitry for each input texture address communicated between shader core and texture sampler.

Returning to FIG. 4, method 401 continues with fetching filter coefficients into the cache. In embodiments, coefficient values are fetched for each texel sub-sample address in a manner dependent on the filter mode. While at least one filter coefficient is needed for each sub-sample address (u',v'), only one filter coefficient $C_{x,y}$ is utilized in the non-separable filter mode while two filter coefficients $H_{A,x}$, $V_{B,y}$ are employed in the separable filter mode. Coefficient precision may vary with implementation. For example, 8 bit or 16 bit coefficients may be supported in either separable or non-separable modes. In one exemplary embodiment, multiple levels of precision (e.g., selectable between 8 bit and 16 bit) are supported for a coefficient (e.g., $C_{x,y}$). In certain separable mode embodiments, values from two coefficient tables (one for $H_{A,x}$ and one for $V_{B,y}$) are cached for each sub-sample address. Also, in certain non-separable filter mode embodiments, coefficients are accessed based only on the non-fractional portion of the input texture address with any fractional portions of an input texture address ($\beta_u$, $\beta_v$) ignored (e.g., rounded). Hence, non-separable filters may provide texel-level precision. For certain separable filter mode embodiments however, the cached coefficients values are based on (or a function of, or dependent on) the fractional portion of the input texture address. Such embodiments offer sub-texel precision. Further description of such fractional addressing for filter coefficients and other aspects of the separable filter mode are provided further below in the context of FIGS. 6A-6E following discussion of method 401.

Continuing in reference to FIG. 4, a texel color value corresponding to each sub-sample address (u',v') is fetched from memory into the texel data cache at operation 440. Any techniques known in the art may be utilized at operation 440 as embodiments are not limited in this respect. At operation 450 sub-sampled texture data is filtered based on the texel color value and coefficient value associated with each texel sub-sample address. For example, the filter function equation provided above may be implemented with filter logic circuitry that multiplies the filter coefficient (e.g., $C_{x,y}$) at each sub-sample address (u',v') with the color value of the corresponding texel ($T_{x,y}$) at each sub-sample address (u',v'). The resulting color value for each sub-sample address is then passed to an accumulator, which may also be implemented in the filtering logic circuitry of the sampler. In the accumulator, values are accumulated in each color channel (e.g., R/B/G) over all of the sub-sample addresses (u',v'). The accumulated color is then returned at operation 470 (e.g., to EU 110) as the sampled and filtered color for a pixel, which may also be packed along with filtered colors corresponding to other pixels. While method 401 is generally applicable to both non-separable and separable filter modes, various operations in method 401 (e.g., 420, 430, and 440) are dependent on the filter mode. Additional aspects particular to the separable filter mode are now described in greater detail in the context of FIGS. 6A-6E.

Figure 6A:
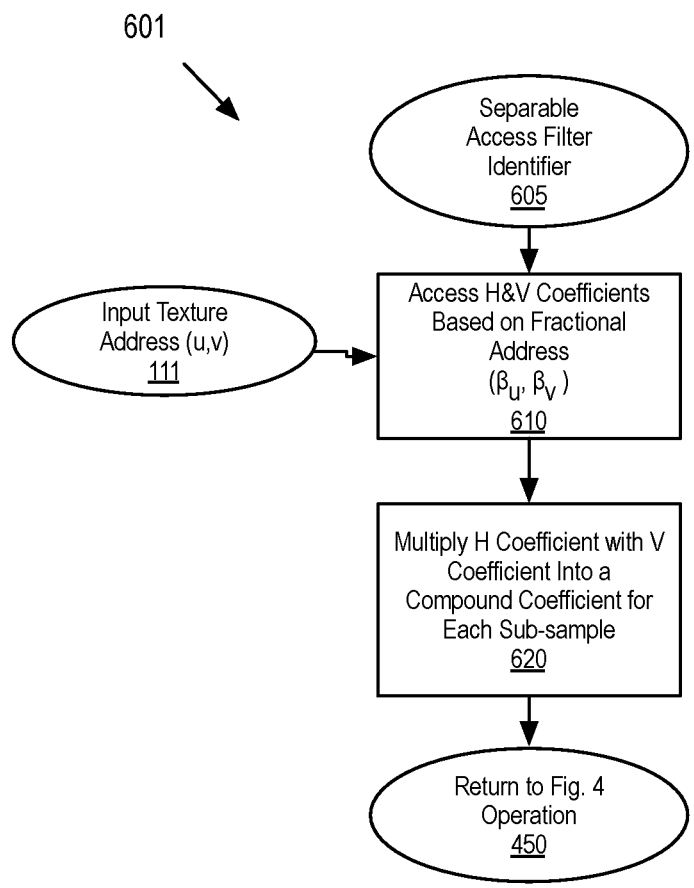
FIG. 6A is a flow diagram illustrating a separable texture filter method that may be implemented as the method depicted in FIG. 4 is performed, in accordance with one or more separable filter embodiments.
Figure 6B:
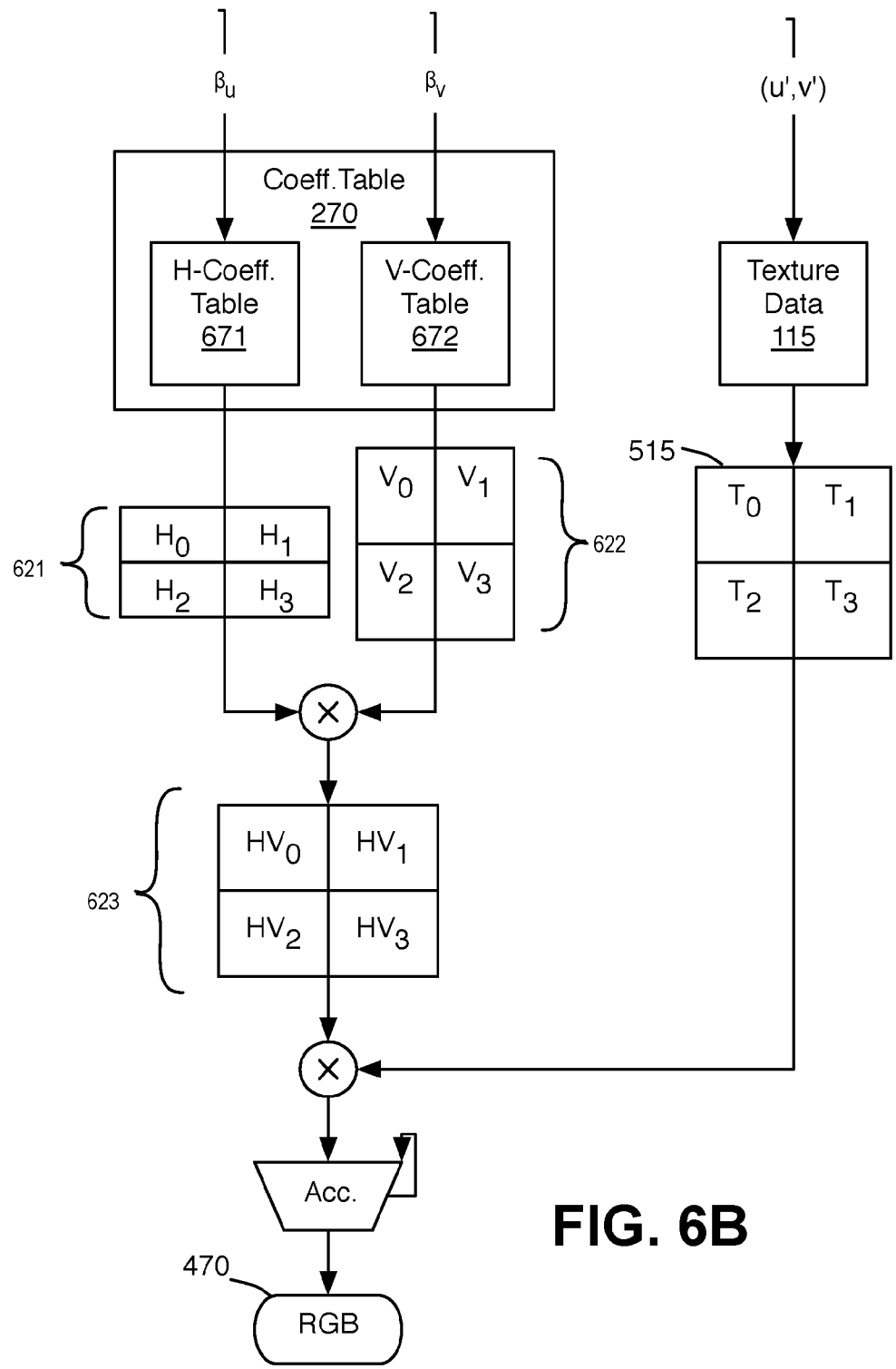
FIG. 6B illustrates a data pipeline as a separable texture filter method is performed by a system having an architecture as in FIG. 2, in accordance with one or more embodiments.
Figure 6E:
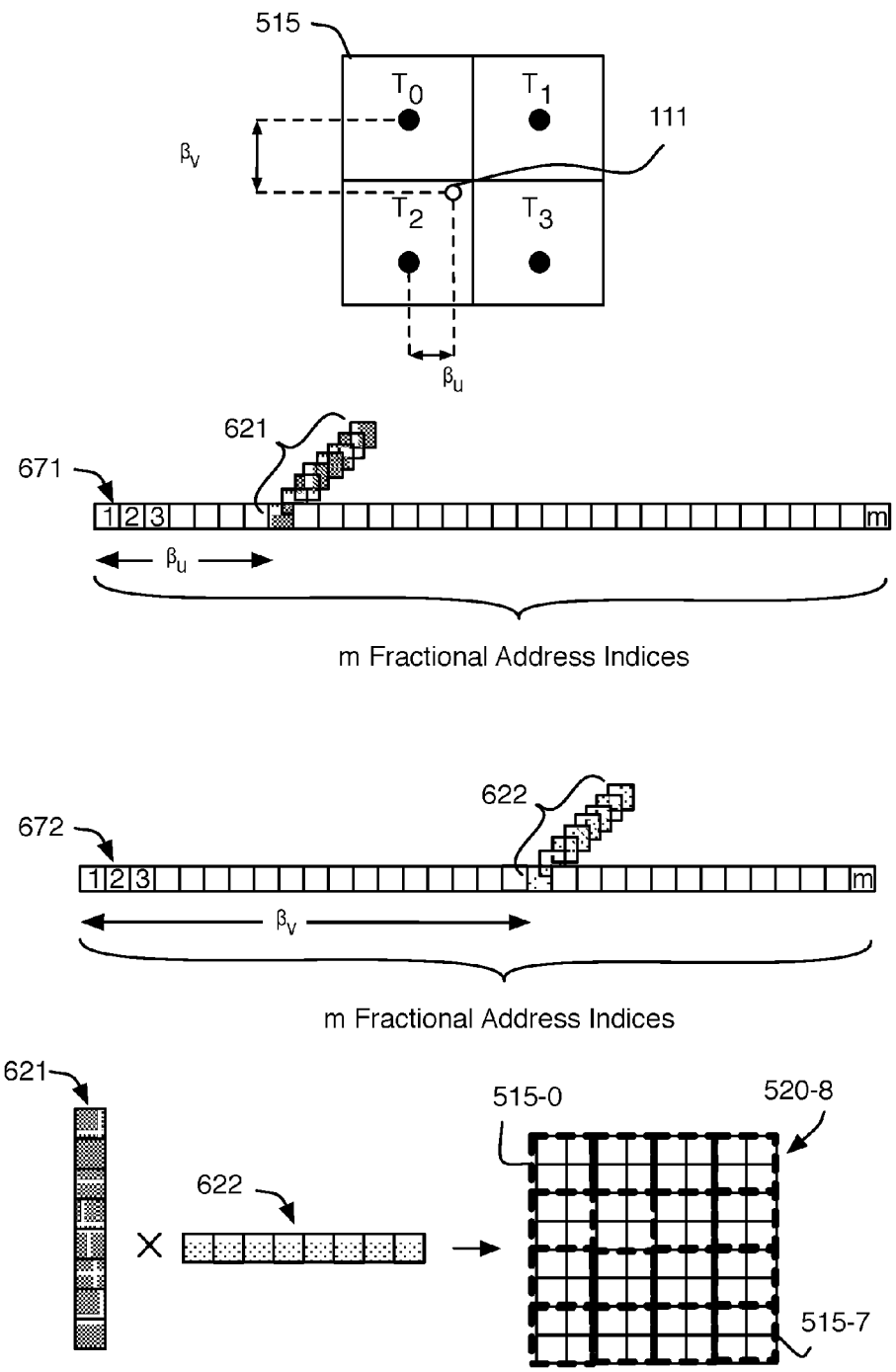
FIG. 6E illustrates a fractional address indexing of filter coefficient tables during execution of the separable filter method in FIG. 6A, in accordance with one or more embodiments.

FIG. 6A is a flow diagram illustrating a separable texture filter method 601 that may be implemented as a portion of operation 430, in accordance with embodiments. Method 601 begins at operation 605 with an indication that the sampler is in the separable filter mode. At operation 610 horizontal and vertical coefficients are chosen from the vertical and horizontal coefficient tables with the fractional portion of the input texture address 111 (e.g., $\beta_u$, $\beta_v$). These fractional address portions are illustrated in FIG. 6E for an input texture address 111 for the exemplary texel quad 515. As further illustrated in FIG. 6B, vertical coefficient table 671 is accessed based on $\beta_v$, and horizontal coefficient table 672 is accessed based on $\beta_v$. In embodiments, each of the coefficient tables 671, 672 have a set of coefficient values for each of a plurality of fractional address values. Each set indexed by a particular fractional address includes a coefficient value for each of the maximum number of texels permitted by the bounding region with non-zero coefficient values corresponding to filter taps. For example, as further depicted in FIGS. 6C and 6D, tables are indexed by fractional address values and each table entry includes 2-8 non-zero coefficients (filter taps $Tap_0$-$Tap_8$). The upper bound on taps is dependent on the size of the bounding region, which is 8×8 texels in the exemplary embodiment. The number of non-zero coefficient values corresponds to the number of contributing texels for that dimension. For example, referring to FIG. 6E, in the horizontal table 671, entries are traversed by $\beta_u$ to choose offset horizontal coefficients. The fractional address may be rounded to the nearest index value and depending on the implementation, various levels of precision may be supported for the fractional address indexing. For example, each table may have 32, 64, 128, or 256 entries, etc. The horizontal coefficients 621 of the corresponding table entry are then accessed. In the depicted example there are a maximum of 8 such coefficients corresponding to an 8 texel wide bounding region. The number of these coefficient values that are non-zero correspond to the number of texels defined by the footprint width w (i.e., number of contributing first filter taps). In the vertical table 672, entries are traversed by $\beta_v$ to choose properly offset vertical coefficients. The vertical coefficients 622 of the corresponding entry are then accessed. In the depicted example there are 8 such coefficients corresponding to an 8 texel tall bounding region. The number of these coefficient values that are non-zero correspond to the number of texels defined by the footprint height h (i.e., number of contributing second filter taps).

Continuing with description of method 601, using the above technique to properly offset horizontal and vertical coefficients, the coefficients are fetched from memory into the coefficient cache following the sequencing of the texel groupings of the minimum granularity that were generated at operation 420. In the exemplary embodiment where this minimum grouping is the texel quad containing 2×2 neighboring texels, four coefficients for each texel quad (e.g., the two horizontal coefficients 621 and the two vertical coefficients 622 and in FIG. 6B) are advantageously fetched from memory into one cache line. A number of such coefficient cache lines may be sequenced over the number of texel quads generated for the specified separable filter footprint (e.g., two cache lines for two texel quads, sixteen cache lines for sixteen quads, etc.). The separable filter equation above may then be implemented with the cached vertical and horizontal coefficient for each sub-sample address multiplied together to form a compound (2D) coefficient at operation 520. This is further illustrated for the exemplary 2×2 texel quad in FIG. 6B where horizontal coefficients $H_0$, $H_1$, are multiplied by vertical coefficients $V_0$ and $V_1$ to arrive at compound coefficients $HV_0$ and $HV_1$. Horizontal coefficients $H_2$ and $H_3$ are each similarly multiplied by vertical coefficients $V_2$ and $V_3$ to arrive at compound coefficients $HV_2$ and $HV_3$. At this point, method 601 can return to operation 450 in method 401 where the cached lines of filter coefficients are the compound coefficients output from method 601. Operations 450 and 460 of method 401 then proceed as further exemplified in FIG. 6B where the compound filter coefficients 623 are then multiplied with the texel color values $T_0$, $T_1$, $T_2$, and $T_3$ for the corresponding quad 515 of sub-sample addresses (which may be similarly stored in a single cache line). The resulting weighted texel color values are then accumulated over all sub-sample addresses sequenced for the separable footprint to arrive at the filtered color value output from the texture sampler at operation 470.

Figure 7:
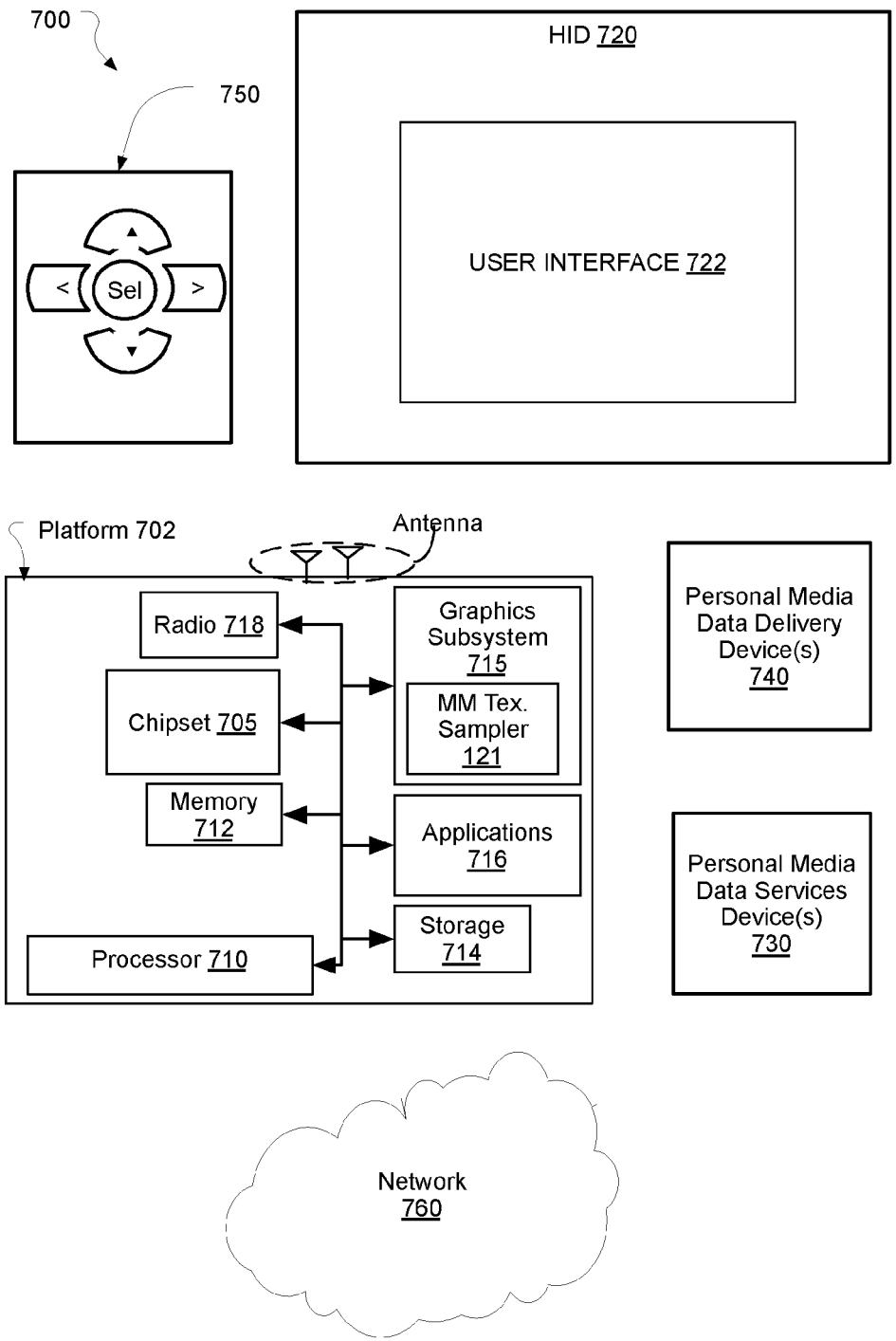
FIG. 7 is an illustrative diagram of an exemplary system, in accordance with one or more embodiments.

FIG. 7 is an illustrative diagram of an exemplary system 700, in accordance with embodiments. System 700 may implement all or a subset of the various functional blocks depicted in FIG. 2. For example, in one embodiment the MM texture sampler 121 is included in the system 700. System 700 may be a mobile device although system 700 is not limited to this context. For example, system 700 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 700 may also be an infrastructure device. For example, system 700 may be incorporated into a large format television, set-top box, desktop computer, or other home or commercial network device.

In various implementations, system 700 includes a platform 702 coupled to a HID 720. Platform 702 may receive captured personal media data from a personal media data services device(s) 730, a personal media data delivery device(s) 740, or other similar content source. A navigation controller 750 including one or more navigation features may be used to interact with, for example, platform 702 and/or HID 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be a multi-core processor(s), multi-core mobile processor(s), and so forth. In one exemplary embodiment, processor 710 invokes or otherwise implements processes and/or methods of the CMMS 101 and the various modules described in as components of CMMS 101 elsewhere herein.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video media data for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The texture sampler features and related texture sampling and filtering techniques described herein may be implemented in various hardware architectures. For example, graphics and/or video functionality may be integrated within a chipset. Alternatively, a discrete graphics and/or video processor may be used. As still another embodiment, the methods and functions described herein may be provided by a general purpose processor, including a multi-core processor. In further embodiments, the methods and functions may be implemented in a purpose-built consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, HID 720 may include any television type monitor or display. HID 720 may include, for example, a computer display screen, touch screen display, video monitor, television-like device, and/or a television. HID 720 may be digital and/or analog. In various implementations, HID 720 may be a holographic display. Also, HID 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on HID 720.

In various implementations, personal media services device(s) 730 may be hosted by any national, international and/or independent service and thus accessible to platform 702 via the Internet, for example. Personal media services device(s) 730 may be coupled to platform 702 and/or to display 720. Platform 702 and/or personal services device(s) 730 may be coupled to a network 760 to communicate (e.g., send and/or receive) media information to and from network 760. Personal media delivery device(s) 740 also may be coupled to platform 702 and/or to HID 720.

In various implementations, personal media data services device(s) 730 may include a cable television box, personal computer, network, telephone, Internet enabled devices or appliance capable of delivering digital information and/or content, and any other similar device capable of unidirectionally or bidirectionally communicating content between a media data provider and platform 702, via network 760 or directly. It will be appreciated that the content may be communicated unidirectionally and/or bidirectionally to and from any one of the components in system 700 and a provider via network 760. Examples of personal media include any captured media information including, for example, video, music, medical and gaming information, and so forth.

Personal media data services device(s) 730 may receive content including media information with examples of content providers including any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., HID 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or HID 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other personal media services device(s) 730 or personal media delivery device(s) 740 even when the platform is turned "off." In addition, chipset 705 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and personal media data services device(s) 730 may be integrated, or platform 702 and captured media data delivery device(s) 640 may be integrated, or platform 702, personal media services device(s) 730, and personal media delivery device(s) 740 may be integrated, for example. In various embodiments, platform 702 and HID 720 may be an integrated unit. HID 720 and content service device(s) 730 may be integrated, or HID 720 and personal media delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 8:
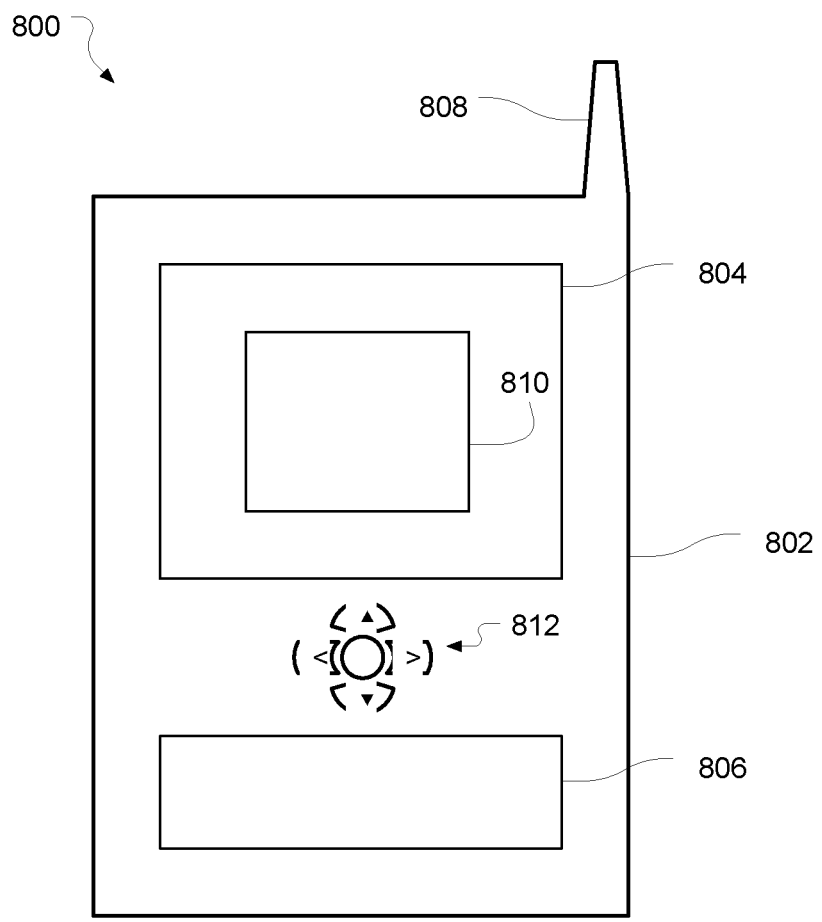
FIG. 8 is an illustrative diagram of an exemplary system, arranged in accordance with an embodiment.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: programs, applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Instructions representing various logic within the processor, which when read by a machine may also cause the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

In one or more first embodiment, a graphics processing system, comprises a texel cache to store predetermined texel color values, a coefficient cache to store predetermined filter coefficient values, an execution unit to provide an input texture address, and texture sampler logic circuitry communicatively coupled to the execution unit, to the texel cache, and to the coefficient cache. The texture sampler is to return filtered texture data to the execution unit based on the input texture address and cached values.

In furtherance of the one or more first embodiment, the texture sampler is selectively operable in both a separable filter mode and a non-separable filter mode for a plurality of programmable filter footprints.

In furtherance of the one or more first embodiment, the texture sampler is further to generate a sequence of texel sub-sample addresses based on the input texture address and a filter footprint identifying one or more texel sub-sampling position within a bounding region.

In furtherance of the one or more first embodiment, the texture sampler is further to generate a sequence of texel sub-sample addresses based on the input texture address and a filter footprint identifying one or more texel sub-sampling position within a bounding region. The sequence comprises groupings of a predetermined number of sub-samples associated with a set of neighboring texels that contain at least one contributing texel.

In furtherance of the one or more first embodiment, the texture sampler is further to generate a sequence of texel sub-sample addresses based on the input texture address and a filter footprint identifying one or more texel sub-sampling position within a bounding region, is further to fetch coefficient values into the coefficient cache for each texel sub-sample address in a manner dependent on the filter mode, is further to fetch color values into the texel cache for each texel sub-sample address, and is further to filter the sub-sampled texture data based on the color value and coefficient value associated with each texel sub-sample address.

In furtherance of the one or more first embodiment, the texture sampler in the separable filter mode is to generate four sub-sample addresses for each texel quad containing at least one texel specified by a first 1D footprint having a first programmable number of texels and a second 1D footprint having a second programmable number of texels specified within a predetermined bounding region. The texture sampler in the non-separable filter mode is to generate four sub-sample addresses for each texel quad that contains at least one texel having a non-zero coefficient value.

In furtherance of the one or more first embodiment, the texture sampler in the separable filter mode is to generate four sub-sample addresses for each texel quad containing at least one texel within a first 1D footprint having a first number of texels and within a second 1D footprint having a second number of texels specified within a predetermined bounding region, and is to fetch into the coefficient cache a coefficient value for each sub-sample address, the coefficient value based on the fractional portion of the input texture address.

In furtherance of the one or more first embodiment, the texture sampler in the separable filter mode is to generate four sub-sample addresses for each texel quad containing at least one texel within a first 1D footprint having a first number of texels and within a second 1D footprint having a second number of texels specified within a predetermined bounding region. The texture sampler in the separable filter mode is to fetch into the coefficient cache a pair of coefficient values for each sub-sample address, a first of the coefficient values based on a horizontal fractional portions of the input texture address and a second of the coefficient values based on a vertical fractional portion of the input texture address. The texture sampler in the separable filter mode is to generate a compound coefficient for each sub-sample address by multiplying each pair of coefficient values at each sub-sample address. The texture sampler in the separable filter mode is to generate a weighted texel color value by multiplying each compound coefficient value with a texel color value for the corresponding sub-sample address. The texture sampler in the separable filter mode is to generate a filtered color value corresponding to the input texture address by accumulating the weighted texel colors determined for each texel over the footprint.

In furtherance of the one or more first embodiment, the filter footprints are programmable to include any number of individual texels between one texel and all texels disposed within a predetermined bounding region referenced to the input texture address. The texture sampler is further to, generate a sequence of texel sub-sample addresses based on the input texture address and the filter footprint, wherein the sequence includes four texel sub-sample address for each texel quad containing at least one contributing texel. The texture sampler is further to fetch coefficient values and color values corresponding to each of the texel sub-sample addresses. The texture sampler is further to accumulate products of the color values and the filter coefficients over all of the texel sub-sample addresses.

In furtherance of the one or more first embodiment, the system further includes a memory to store a coefficient table specifying filter coefficients for each texel within the bounding region. The system further includes an application programming interface (API) providing write access to data stored in the coefficient table. The system further includes logic circuitry to update the coefficient cache with data stored in the coefficient table.

In furtherance of the one or more first embodiment, the system further includes a memory to store a coefficient table specifying filter coefficients for each texel within the bounding region. The system further includes an application programming interface (API) to provide write access to data stored in the coefficient table and to select between the separable and non-separable filter modes. The system further includes logic circuitry to update the coefficient cache with data stored in the coefficient table.

In one or more second embodiments, a graphics processing system comprises a texel cache to store predetermined texel color values, a coefficient cache to store predetermined weighting coefficient values, an execution unit to generate an input texture address, and texture sampler logic circuitry communicatively coupled to the execution unit and to the texel cache and coefficient cache. The texture sampler is to generate four sub-sample addresses for each texel quad containing at least one texel within a horizontal 1D footprint having a first number of texels and within a vertical 1D footprint having a second number of texels defined within a predetermined bounding region.

In furtherance of the one or more second embodiment, the texture sampler is further to fetch into the coefficient cache a pair of coefficient values for each sub-sample address, a first of the coefficient values based on a horizontal fractional portion of the input texture address, and a second of the coefficient values based on a vertical fractional portion of the input texture address. The texture sampler is further to generate a compound coefficient for each sub-sample address by multiplying each pair of coefficients at each sub-sample address. The texture sampler is further to generate a weighted texel color value by multiplying each compound coefficient with a texel color value for the corresponding sub-sample address. The texture sampler is further to generate a filtered color value corresponding to the input texture address by accumulating the weighted texel colors determined for each texel within the footprint.

In furtherance of the one or more second embodiment, the system further comprises a memory to store a horizontal coefficient table and a vertical coefficient table. The system further comprises an application programming interface (API) providing write access to specify in the horizontal coefficient table a set of the horizontal coefficient values for each of a plurality of fractional horizontal address values, each set including a coefficient value for each of the maximum number of texels permitted by the bounding region, the number of non-zero coefficient values being equal to the first number of texels. The API further providing write access to specify in the vertical coefficient table a set of the vertical coefficient values for each of a plurality of fractional vertical address values, each set including a coefficient value for each of the maximum number of texels permitted by the bounding region, the number of non-zero coefficient values being equal to the second number of texels. The system further includes logic circuitry to update the coefficient cache with the sets of horizontal and vertical coefficient values.

In one or more third embodiments, a method for filtering graphical texture data comprises receiving an input texture address, generating a sequence of texel sub-sample addresses based on the input texture address and a filter footprint identifying one or more texel sampling position within a bounding region, and fetching coefficient values into a coefficient cache for each texel sub-sample address.

In furtherance of the one or more third embodiments, the method further includes fetching color values into a texel cache for each texel sub-sample address, multiplying together the color value and coefficient value associated with each texel sub-sample address, generating filtered texture data by accumulating products of the color values and the weighting coefficients over all of the texel sub-sample addresses, and outputting the filtered texture data.

In furtherance of the one or more third embodiments, the method further includes accessing a filter mode identifier specifying a separable or non-separable filter mode. The method further includes generating the sequence of texel sub-sample addresses further comprises: generating four texel sub-sample address for each texel quad containing at least one texel within the footprint. In the method, fetching coefficient values into the coefficient cache for each texel sub-sample address further comprises, accessing, in response to the filter mode identifier specifying the separable filter mode, a stored vertical coefficient and a stored horizontal coefficient for each sub-sample address based on the fractional portion of the input texture address, and accessing, in response to the filter mode identifier specifying the non-separable filter, a single stored coefficient for each sub-sample address based on the non-fractional portion of the input texture address.

In furtherance of the one or more third embodiments, the method further includes accessing a filter mode identifier specifying a separable or non-separable filter mode. In response to the filter mode identifier specifying the separable filter mode, the method further comprises generating four sub-sample addresses for each texel quad containing at least one texel within a first 1D footprint having a first number of texels and within a second 1D footprint having a second number of texels defined within a predetermined bounding region. In response to the filter mode identifier specifying the separable filter mode, the method further comprises accessing a stored vertical coefficient and a stored horizontal coefficient for each sub-sample address based on the fractional portion of the input texture address. In response to the filter mode identifier specifying the separable filter mode, the method further comprises generating a compound coefficient for each sub-sample address by multiplying together the vertical and horizontal coefficients at each sub-sample address. In response to the filter mode identifier specifying the separable filter mode, the method further comprises generating a weighted texel color value by multiplying each compound coefficient with a texel color value for the corresponding sub-sample address. In response to the filter mode identifier specifying the separable filter mode, the method further comprises generating a filtered color value corresponding to the input texture address by accumulating the weighted texel colors determined for each texel over the footprint.

In furtherance of the one or more third embodiments, the method further includes accessing a filter mode identifier specifying a separable or non-separable filter mode. The method, in response to the filter mode identifier specifying the separable filter mode, further comprises generating four sub-sample addresses for each texel quad containing at least one texel within a first 1D footprint having a first number of texels and within a second 1D footprint having a second number of texels defined within a predetermined bounding region. The method, in response to the filter mode identifier specifying the separable filter mode, further comprises fetching into the coefficient cache a pair of coefficient values for each sub-sample address, a first of the coefficient values based on a horizontal fractional portion of the input texture address and a second of the coefficient values based on a vertical fractional portion of the input texture.

In furtherance of the one or more third embodiments, the method further includes accessing a filter mode identifier specifying a separable or non-separable filter mode. In response to the filter mode identifier specifying the separable filter mode, the method further comprises generating four sub-sample addresses for each texel quad containing at least one texel within a first 1D footprint having a first number of texels and within a second 1D footprint having a second number of texels defined within a predetermined bounding region. In response to the filter mode identifier specifying the separable filter mode, the method further comprises determining a horizontal coefficient value for one or more taps specified by the first number of texels by indexing, with a horizontal fractional address value, a stored table of horizontal coefficient values. In response to the filter mode identifier specifying the separable filter mode, the method further comprise determining a vertical coefficient value for each of one or more taps specified by the second number of texels by indexing, with a vertical fractional address value, a stored table of vertical coefficient values.

In one or more fourth embodiments, a method for filtering graphical texture data, the method comprises receiving an input texture address, determining a filter mode identifier is indicative of a separable filter mode, and generating four sub-sample addresses for each texel quad containing at least one texel within a first 1D footprint having a first number of texels and within a second 1D footprint having a second number of texels defined within a predetermined bounding region. The method further comprises accessing a stored vertical coefficient and a stored horizontal coefficient for each sub-sample address based on the fractional portion of the input texture address, generating a compound coefficient for each sub-sample address by multiplying together the vertical and horizontal coefficients at each sub-sample address, generating a weighted texel color value by multiplying each compound coefficient with a texel color value for the corresponding sub-sample address, and generating a filtered color value corresponding to the input texture address by accumulating the weighted texel colors determined for each texel over the footprint.

In furtherance of the one or more fourth embodiments, accessing a stored vertical coefficient and a stored horizontal coefficient for each sub-sample address based on the fractional portion of the address further comprises determining a horizontal coefficient value for one or more taps specified by the first number of texels by indexing, with a horizontal fractional address value, a stored table of horizontal coefficient values, and determining a vertical coefficient value for each of one or more taps specified by the second number of texels by indexing, with a vertical fractional address value, a stored table of vertical coefficient values.

In one or more fifth embodiments, at least one machine-readable storage medium includes machine-readable instructions, that in response to being executed on a computing device, cause the computing device to filter graphical texture data by generating a sequence of texel sub-sample addresses based on an input texture address and a filter footprint identifying one or more texel sub-sampling position within a bounding region, and fetching coefficient values into a coefficient cache for each texel sub-sample address.

In furtherance of the one or more fifth embodiments, the media includes instructions for fetching color values into a texel cache for each texel sub-sample address, multiplying together the color value and coefficient value associated with each texel sub-sample address, generating filtered texture data by accumulating products of the color values and the weighting coefficients over all of the texel sub-sample addresses, and outputting the filtered texture data.

In furtherance of the one or more fifth embodiments, generating the sequence of texel sub-sample addresses further comprises generating four texel sub-sample address for each texel quad containing at least one texel within the footprint. Fetching coefficient values into the coefficient cache for each texel sub-sample address further comprises accessing, in response to a filter mode identifier specifying the separable filter mode, a stored vertical coefficient and a stored horizontal coefficient for each sub-sample address based on the fractional address of the input texture address; and accessing, in response to a filter mode identifier specifying the non-separable filter, a single stored coefficient for each sub-sample address based on the non-fractional address of the input texture address.

In furtherance of the one or more fifth embodiments, the media includes instructions, that in response to being executed by the computing device, cause the computing device to filter graphical texture data with a separable filter by generating four sub-sample addresses for each texel quad containing at least one texel within a first 1D footprint having a first number of texels and within a second 1D footprint having a second number of texels within a predetermined bounding region, determining a horizontal coefficient value for one or more taps specified by the first number of texels by indexing, with a horizontal fractional address value, a stored table of horizontal coefficient values, determining a vertical coefficient value for each of one or more taps specified by the second number of texels by indexing, with a vertical fractional address value, a stored table of vertical coefficient values, generating a compound coefficient for each sub-sample address by multiplying together the vertical and horizontal coefficients at each sub-sample address, generating a weighted texel color value by multiplying each compound coefficient with a texel color value for the corresponding sub-sample address, and generating a filtered color value corresponding to the input texture address by accumulating the weighted texel colors determined for each texel over the footprint.

It will be recognized that the implementation is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the implementation should, therefore, be determined with reference to the appended claims, along with the full scope of equivalents to which such claims are entitled.

What is claimed is:

1. A graphics processing system, comprising:
a texel cache to store predetermined texel color values;
a coefficient cache to store predetermined filter coefficient values fetched from a memory;
an execution unit to provide an input texture address; and
a texture sampler comprising circuitry, the texture sampler communicatively coupled to the execution unit, to the texel cache, and to the coefficient cache, the texture sampler to return filtered texture data to the execution unit based on the input texture address and cached values of the texel cache and the coefficient cache, wherein the texture sampler to generate a sequence of texel sub-sample addresses based on the input texture address and a filter footprint identifying one or more texel sub-sampling position within a bounding region, and wherein the sequence comprises groupings of a predetermined number of subsamples associated with a set of neighboring texels that contain at least one contributing texel.

2. The system of claim 1, wherein the texture sampler is selectively operable in both a separable filter mode and a non-separable filter mode for a plurality of programmable filter footprints.

3. The system of claim 1, wherein the texture sampler is further to generate a sequence of texel sub-sample addresses based on the input texture address and a filter footprint identifying one or more texel sub-sampling position within a bounding region.

4. The system of claim 1, wherein the texture sampler is further to:

generate a sequence of texel sub-sample addresses based on the input texture address and a filter footprint identifying one or more texel sub-sampling position within a bounding region;
fetch coefficient values into the coefficient cache for each texel sub-sample address in a manner dependent on a specified filter mode;
fetch color values into the texel cache for each texel sub-sample address; and
filter the sub-sampled texture data based on the color value and coefficient value associated with each texel sub-sample address.

5. The system of claim 1, wherein:
the texture sampler when in a separable filter mode is to generate four sub-sample addresses for each texel quad containing at least one texel specified by a first 1D footprint having a first programmable number of texels and a second 1D footprint having a second programmable number of texels; or
the texture sampler when in a non-separable filter mode is to generate four sub-sample addresses for each texel quad that contains at least one texel having a non-zero coefficient value.

6. The system of claim 1, wherein the texture sampler when in separable filter mode is to:
generate four sub-sample addresses for each texel quad containing at least one texel within a first 1D footprint having a first number of texels and within a second 1D footprint having a second number of texels; and
fetch into the coefficient cache a coefficient value for each sub-sample address, the coefficient value based on the fractional portion of the input texture address.

7. The system of claim 1, wherein the texture sampler in a separable filter mode is to:
generate four sub-sample addresses for each texel quad containing at least one texel within a first 1D footprint having a first number of texels and within a second 1D footprint having a second number of texels specified within a predetermined bounding region;
fetch into the coefficient cache a pair of coefficient values for each sub-sample address, a first of the coefficient values based on a horizontal fractional portion of the input texture address and a second of the coefficient values based on a vertical fractional portion of the input texture address;
generate a compound coefficient for each sub-sample address by multiplying each pair of coefficient values at each sub-sample address;
generate a weighted texel color value by multiplying each compound coefficient value with a texel color value for the corresponding sub-sample address; and
generate a filtered color value corresponding to the input texture address by accumulating the weighted texel colors determined for each texel over the footprint.

8. The system of claim 1, wherein:
the filter footprints are programmable to include any number of individual texels between one texel and all texels disposed within a predetermined bounding region referenced to the input texture address; and
the texture sampler is further to:
generate a sequence of texel sub-sample addresses based on the input texture address and the filter footprint, wherein the sequence includes four texel sub-sample addresses for each texel quad containing at least one contributing texel;
fetch coefficient values and color values corresponding to each of the texel sub-sample addresses; and accumulate products of the color values and the filter coefficients over all of the texel subsample addresses.

9. The system of claim 1, further comprising:
an application programming interface (API) providing write access to data stored in a coefficient table, the coefficient table to specify filter coefficients for each texel within a bounding region, the memory to store the coefficient table.

10. The system of claim 1, further comprising:
a coefficient table specifying filter coefficients for each texel within a bounding region, the memory to store the coefficient table; and
an application programming interface (API) to provide write access to data stored in the coefficient table and to select between separable and non-separable filter modes.

11. A graphics processing system comprising:
a texel cache to store predetermined texel color values;
a coefficient cache to store predetermined weighting coefficient values fetched from a memory;
an execution unit to generate an input texture address; and
a texture sampler comprising circuitry, the texture sampler communicatively coupled to the execution unit and to the texel cache and coefficient cache, the texture sampler to:
generate a plurality of sub-sample addresses for each texel within a horizontal 1D footprint having a first number of texels and within a vertical 1D footprint having a second number of texels defined within a predetermined bounding region;
fetch into the coefficient cache a pair of coefficient values for each sub-sample address, a first of the coefficient values based on a horizontal fractional portion of the input texture address, and a second of the coefficient values based on a vertical fractional portion of the input texture address;
generate a compound coefficient for each sub-sample address by multiplying each pair of coefficients at each sub-sample address;
generate a weighted texel color value by multiplying each compound coefficient with a texel color value for the corresponding sub-sample address; and
generate a filtered color value corresponding to the input texture address by accumulating the weighted texel colors determined for each texel within the footprint.

12. The system of claim 11, further comprising:
a horizontal coefficient table and a vertical coefficient table to be stored in the memory; and
an application programming interface (API) providing write access to:
specify in the horizontal coefficient table a set of the horizontal coefficient values for each of a plurality of fractional horizontal address values, each set including a coefficient value for each of the maximum number of texels permitted by the bounding region, the number of non-zero coefficient values being equal to the first number of texels; and
specify in the vertical coefficient table a set of the vertical coefficient values for each of a plurality of fractional vertical address values, each set including a coefficient value for each of the maximum number of texels permitted by the bounding region, the number of non-zero coefficient values being equal to the second number of texels.

13. A method for filtering graphical texture data, the method comprising:
receiving an input texture address;
generating a sequence of texel sub-sample addresses based on the input texture address and a filter footprint identifying one or more texel sampling position within a bounding region;
fetching coefficient values from a memory into a coefficient cache for each texel sub-sample address; and
accessing a filter mode identifier specifying a separable or non-separable filter mode; and
wherein:
generating the sequence of texel sub-sample addresses further comprises generating four texel sub-sample address for each texel quad containing at least one texel within the footprint; and
fetching coefficient values into the coefficient cache for each texel sub-sample address further comprises:
accessing, in response to the filter mode identifier specifying the separable filter mode, a stored vertical coefficient and a stored horizontal coefficient for each sub-sample address based on the fractional portion of the input texture address; or
accessing, in response to the filter mode identifier specifying the nonseparable filter, a single stored coefficient for each sub-sample address based on the non-fractional portion of the input texture address.

14. The method of claim 13, further comprising:
fetching color values into a texel cache for each texel sub-sample address;
multiplying together the color value and coefficient value associated with each texel subsample address;
generating filtered texture data by accumulating products of the color values and the weighting coefficients over all of the texel sub-sample addresses; and
outputting the filtered texture data.

15. The method of claim 14, further comprising accessing a filter mode identifier specifying a separable or non-separable filter mode; and
wherein in response to the filter mode identifier specifying the separable filter mode, the method further comprises:
generating four sub-sample addresses for each texel quad containing at least one texel within a first 1D footprint having a first number of texels and within a second 1D footprint having a second number of texels defined within a predetermined bounding region;
accessing a stored vertical coefficient and a stored horizontal coefficient for each sub-sample address based on the fractional portion of the input texture address;
generating a compound coefficient for each sub-sample address by multiplying together the vertical and horizontal coefficients at each sub-sample address;
generating a weighted texel color value by multiplying each compound coefficient with a texel color value for the corresponding sub-sample address; and
generating a filtered color value corresponding to the input texture address by accumulating the weighted texel colors determined for each texel over the footprint.

16. The method of claim 13, further comprising accessing a filter mode identifier specifying a separable or non-separable filter mode; and wherein the method, in response to the filter mode identifier specifying the separable filter mode, further comprises:
  generating four sub-sample addresses for each texel quad containing at least one texel within a first 1D footprint having a first number of texels and within a second 1D footprint having a second number of texels defined within a predetermined bounding region; and
  fetching into the coefficient cache a pair of coefficient values for each sub-sample address, a first of the coefficient values based on a horizontal fractional portion of the input texture address and a second of the coefficient values based on a vertical fractional portion of the input texture.

17. The method of claim 13, further comprising accessing a filter mode identifier specifying a separable or non-separable filter mode; and
  wherein, in response to the filter mode identifier specifying the separable filter mode, the method further comprises:
    generating four sub-sample addresses for each texel quad containing at least one texel within a first 1D footprint having a first number of texels and within a second 1D footprint having a second number of texels defined within a predetermined bounding region;
    determining a horizontal coefficient value for one or more taps specified by the first number of texels by indexing, with a horizontal fractional address value, a stored table of horizontal coefficient values; and
    determining a vertical coefficient value for each of one or more taps specified by the second number of texels by indexing, with a vertical fractional address value, a stored table of vertical coefficient values.

18. A method for filtering graphical texture data, the method comprising:
  receiving an input texture address;
  determining a filter mode identifier is indicative of a separable filter mode; generating four sub-sample addresses for each texel quad containing at least one texel within a first 1D footprint having a first number of texels and within a second 1D footprint having a second number of texels defined within a predetermined bounding region;
  accessing, from a memory, a stored vertical coefficient and a stored horizontal coefficient for each sub-sample address based on the fractional portion of the input texture address;
  generating a compound coefficient for each sub-sample address by multiplying together the vertical and horizontal coefficients at each sub-sample address;
  generating a weighted texel color value by multiplying each compound coefficient with a texel color value for the corresponding sub-sample address; and
  generating a filtered color value corresponding to the input texture address by accumulating the weighted texel colors determined for each texel over the footprint.

19. The method of claim 18, wherein accessing a stored vertical coefficient and a stored horizontal coefficient for each sub-sample address based on the fractional portion of the address further comprises:
  determining a horizontal coefficient value for one or more taps specified by the first number of texels by indexing, with a horizontal fractional address value, a stored table of horizontal coefficient values; and determining a vertical coefficient value for each of one or more taps specified by the second number of texels by indexing, with a vertical fractional address value, a stored table of vertical coefficient values.

20. At least one non-transitory machine-readable storage medium including machine-readable instructions, that in response to being executed on a computing device, cause the computing device to filter graphical texture data by:
  generating a sequence of texel sub-sample addresses based on an input texture address and a filter footprint identifying one or more texel sub-sampling position within a bounding region;
  fetching coefficient values from a memory into a coefficient cache for each texel sub-sample address;
  generating the sequence of texel sub-sample addresses further comprises generating four texel sub-sample address for each texel quad containing at least one texel within the footprint; and
  fetching coefficient values into the coefficient cache for each texel sub-sample address further comprises:
    accessing, in response to a filter mode identifier specifying the separable filter mode, a stored vertical coefficient and a stored horizontal coefficient for each subsample address based on the fractional address of the input texture address; or
    accessing, in response to a filter mode identifier specifying the non-separable filter, a single stored coefficient for each sub-sample address based on the nonfractional address of the input texture address.

21. The at least one non-transitory machine-readable storage medium of claim 20, further comprises instructions for:
  fetching color values into a texel cache for each texel sub-sample address;
  multiplying together the color value and coefficient value associated with each texel subsample address;
  generating filtered texture data by accumulating products of the color values and the weighting coefficients over all of the texel sub-sample addresses; and
  outputting the filtered texture data.

22. The at least one non-transitory machine-readable storage medium of claim 21, further comprising instructions, that in response to being executed by the computing device, cause the computing device to filter graphical texture data with a separable filter by:
  generating four sub-sample addresses for each texel quad containing at least one texel within a first 1D footprint having a first number of texels and within a second 1D footprint having a second number of texels within a predetermined bounding region;
  determining a horizontal coefficient value for one or more taps specified by the first number of texels by indexing, with a horizontal fractional address value, a stored table of horizontal coefficient values;
  determining a vertical coefficient value for each of one or more taps specified by the second number of texels by indexing, with a vertical fractional address value, a stored table of vertical coefficient values;
  generating a compound coefficient for each sub-sample address by multiplying together the vertical and horizontal coefficients at each sub-sample address;
  generating a weighted texel color value by multiplying each compound coefficient with a texel color value for the corresponding sub-sample address; and generating a filtered color value corresponding to the input texture address by accumulating the weighted texel colors determined for each texel over the footprint.

23. An apparatus to filter graphical texture data, the apparatus comprising:
one or more processors to:
receive an input texture address;
determine a filter mode identifier is indicative of a separable filter mode; generating four sub-sample addresses for each texel quad containing at least one texel within a first 1D footprint having a first number of texels and within a second 1D footprint having a second number of texels defined within a predetermined bounding region;
access, from a memory coupled to the one or more processors, a stored vertical coefficient and a stored horizontal coefficient for each sub-sample address based on the fractional portion of the input texture address;
generate a compound coefficient for each sub-sample address by multiplying together the vertical and horizontal coefficients at each sub-sample address;
generate a weighted texel color value by multiplying each compound coefficient with a texel color value for the corresponding sub-sample address; and
generate a filtered color value corresponding to the input texture address by accumulating the weighted texel colors determined for each texel over the footprint.

24. The apparatus of claim 23, wherein the one or more processors are further to:
determine a horizontal coefficient value for one or more taps specified by the first number of texels by indexing, with a horizontal fractional address value, a stored table of horizontal coefficient values; and
determine a vertical coefficient value for each of one or more taps specified by the second number of texels by indexing, with a vertical fractional address value, a stored table of vertical coefficient values.

25. At least one non-transitory machine-readable storage medium comprising instructions that when executed by a machine, cause the machine to perform operations comprising:
receiving an input texture address;
determining a filter mode identifier is indicative of a separable filter mode; generating four sub-sample addresses for each texel quad containing at least one texel within a first ID footprint having a first number of texels and within a second ID footprint having a second number of texels defined within a predetermined bounding region;
accessing, from a memory, a stored vertical coefficient and a stored horizontal coefficient for each sub-sample address based on the fractional portion of the input texture address;
generating a compound coefficient for each sub-sample address by multiplying together the vertical and horizontal coefficients at each sub-sample address;
generating a weighted texel color value by multiplying each compound coefficient with a texel color value for the corresponding sub-sample address; and
generating a filtered color value corresponding to the input texture address by accumulating the weighted texel colors determined for each texel over the footprint.

26. The at least one non-transitory machine-readable storage medium of claim 25, wherein the operations further comprise:
determining a horizontal coefficient value for one or more taps specified by the first number of texels by indexing, with a horizontal fractional address value, a stored table of horizontal coefficient values; and
determining a vertical coefficient value for each of one or more taps specified by the second number of texels by indexing, with a vertical fractional address value, a stored table of vertical coefficient values.

* * * * *